(12) United States Patent
Nix et al.

(10) Patent No.: US 8,656,568 B2
(45) Date of Patent: Feb. 25, 2014

(54) APPARATUS FOR FINAL FINISHING A WHEEL HUB OF A KNUCKLE ASSEMBLY AND RELATED METHOD

(75) Inventors: Jerry Nix, Troy, MI (US); Douglas J. Smith, Batavia, NY (US); Serge Dupin, Batavia, NY (US)

(73) Assignee: SMW Automotive Corporation, Troy, MI (US)

( * ) Notice: Subject to any disclaimer, the term of this patent is extended or adjusted under 35 U.S.C. 154(b) by 215 days.

(21) Appl. No.: 13/097,173

(22) Filed: Apr. 29, 2011

(65) Prior Publication Data

US 2011/0266733 A1 Nov. 3, 2011

Related U.S. Application Data

(60) Provisional application No. 61/329,659, filed on Apr. 30, 2010.

(51) Int. Cl.
*B25B 1/00* (2006.01)
*B23Q 7/00* (2006.01)

(52) U.S. Cl.
USPC ............ 29/255; 269/17; 29/894.362; 29/252

(58) Field of Classification Search
USPC ............... 451/901, 364–405; 269/17; 29/252, 29/255, 270, 278, 894.362
See application file for complete search history.

(56) References Cited

U.S. PATENT DOCUMENTS

| | | | | |
|---|---|---|---|---|
| 1,979,966 | A | * | 11/1934 | Farr et al. .................... 29/894.33 |
| 2,233,371 | A | * | 2/1941 | Smith .............................. 73/487 |
| 3,540,165 | A | * | 11/1970 | Lanham ......................... 451/398 |
| 4,576,367 | A | * | 3/1986 | Horn et al. ...................... 269/32 |

(Continued)

FOREIGN PATENT DOCUMENTS

JP 06201528 7/1994

OTHER PUBLICATIONS

Definition of Keel. http://www.hyperdictionary.com/search.aspx?define=keel. Retrieved on Jun. 9, 2013.*

(Continued)

*Primary Examiner* — Lee D Wilson
*Assistant Examiner* — Tyrone V Hall, Jr.
(74) *Attorney, Agent, or Firm* — Harness, Dickey & Pierce, P.L.C.

(57) ABSTRACT

A fixture for final finishing flange faces of a hub of a knuckle assembly includes a mounting surface, a drive arrangement and a clamping arrangement. The drive arrangement is operative for engaging and rotating the hub of the knuckle assembly relative to the remainder of the knuckle assembly. The drive arrangement includes a drive member extending along a drive axis. The drive member is rotatable about the drive axis. The clamping arrangement is carried by the mounting surface. The clamping arrangement radially surrounds the drive arrangement and is operative for clamping the fixture relative to the mounting surface. The clamping arrangement includes a housing, a piston assembly radially positioned between the housing and the drive member, and a clamping sleeve radially disposed between the piston assembly and the clamping sleeve. The piston is movable in a first direction generally parallel to the drive axis. The clamping sleeve and the piston are cooperatively configured to radially force an upper end of the piston assembly radially outward in a second direction in response to movement of the piston in the first direction for engaging a back bore of the knuckle assembly.

13 Claims, 4 Drawing Sheets

(56) References Cited

U.S. PATENT DOCUMENTS

| | | | |
|---|---|---|---|
| 5,899,305 A * | 5/1999 | Austin et al. | 188/218 XL |
| 5,937,499 A | 8/1999 | Austin et al. | |
| 6,212,981 B1 * | 4/2001 | Brinker et al. | 82/1.11 |
| 6,348,020 B2 * | 2/2002 | Hodjat et al. | 474/166 |
| 6,736,384 B2 * | 5/2004 | Yokota | 269/32 |
| 6,857,190 B2 * | 2/2005 | Gavard et al. | 29/898.062 |
| 6,935,005 B2 * | 8/2005 | Avery et al. | 29/273 |
| 7,159,316 B2 | 1/2007 | Sadanowicz et al. | |
| 2003/0015832 A1 * | 1/2003 | Kohlert | 269/32 |
| 2008/0141533 A1 * | 6/2008 | Bonnet et al. | 29/894.362 |
| 2009/0152784 A1 * | 6/2009 | Yonezawa et al. | 269/32 |

OTHER PUBLICATIONS

International Search Report for International Application No. PCT/US2011/034559, dated Jan. 30, 2012.

Written Opinion of the International Searching Authority for International Application No. PCT/US2011/034559, dated Jan. 30, 2012.

* cited by examiner

APPARATUS FOR FINAL FINISHING A WHEEL HUB OF A KNUCKLE ASSEMBLY AND RELATED METHOD

CROSS-REFERENCE TO RELATED APPLICATIONS

This application claims the benefit of U.S. Provisional Application No. 61/329,659, filed on Apr. 30, 2010. The entire disclosure of the above application is incorporated herein by reference.

FIELD

The present teachings generally pertain to a method and apparatus for final finishing flange faces of a wheel hub of a knuckle assembly.

BACKGROUND

The statements in this section merely provide background information related to the present disclosure and may not constitute prior art.

Conventionally, motor vehicles typically incorporate knuckle assemblies for interconnecting the vehicle suspension with the rotors and wheels. The knuckle assemblies generally include a wheel hub and a knuckle. Each wheel hub is rotationally coupled to an associated knuckle through a wheel bearing assembly. The wheel bearing assemblies include an outer bearing race coupled to the knuckle and two inner bearing races coupled to the wheel hub. The brake rotor and wheel are, in turn, coupled to the wheel hub. In order to enhance the performance of conventional motor vehicles, it is desired to carefully and accurately control the dimensional characteristics of a wheel hub of a knuckle assembly. One critical aspect to control is lateral runout of the hub. A hub with too much lateral runout will wobble as it rotates and create a perceived dynamic imbalance.

Various arrangements have been proposed for final finishing flange faces of a wheel hub assembly of a knuckle assembly to reduce lateral runout. While known arrangements may have proven to be acceptable for their intended purposes, a continuous need for improvement exists within the pertinent art.

SUMMARY

In accordance with one particular aspect, the present teachings provide a fixture for final finishing flange faces of a hub of a knuckle assembly. The fixture includes a mounting surface, a drive arrangement and a clamping arrangement. The drive arrangement is operative for engaging and rotating the hub of the knuckle assembly relative to the remainder of the knuckle assembly. The drive arrangement includes a drive member extending along a drive axis. The drive member is rotatable about the drive axis. The clamping arrangement is carried by the mounting surface. The clamping arrangement radially surrounds the drive arrangement and is operative for clamping the fixture relative to the mounting surface. The clamping arrangement includes a housing, a piston assembly radially positioned between the housing and the drive member, and a clamping sleeve radially disposed between the piston assembly and the clamping sleeve. The piston is movable in a first direction generally parallel to the drive axis. The clamping sleeve and the piston are cooperatively configured to radially force an upper end of the piston assembly radially outward in a second direction in response to movement of the piston in the first direction for engaging a back bore of the knuckle assembly.

In accordance with another particular aspect, the present teachings provide a fixture for final finishing flange faces of a hub of a knuckle assembly. The fixture includes a mounting surface, a drive arrangement and a clamping arrangement. The drive arrangement is operative for engaging and rotating the hub of the knuckle assembly relative to the remainder of the knuckle assembly. The drive arrangement includes an upper shaft portion and a lower shaft portion. The upper shaft portion and the lower shaft portion are coupled for rotation and commonly aligned on a drive axis. The clamping arrangement is carried by the mounting surface. The clamping arrangement radially surrounds the drive arrangement and is operative for clamping the fixture relative to the mounting surface.

In accordance with a further aspect, the present teachings provide a method of securing a knuckle assembly in a fixture for final finishing flange faces of a hub of the knuckle assembly. The method includes providing a fixture having a drive arrangement and a clamping arrangement. The clamping arrangement includes a housing, a piston assembly radially positioned between the housing and the drive member, and a clamping sleeve radially disposed between the piston assembly and the clamping sleeve. The piston is movable in a first direction generally parallel to the drive axis. The method additional includes translating the piston in the first direction and radially forcing the upper end of the piston assembly outward in the second direction in response to movement of the piston in the first direction. The method further includes engaging a backbore of the knuckle assembly with the upper end of the piston assembly.

Thus, it is one general object of the present invention to provide an apparatus for final finishing a wheel hub of a knuckle assembly to have reduced lateral runout.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The details within the various views of the drawings will be understood to be drawn generally to scale.

DETAILED DESCRIPTION OF VARIOUS ASPECTS

Figure 1:
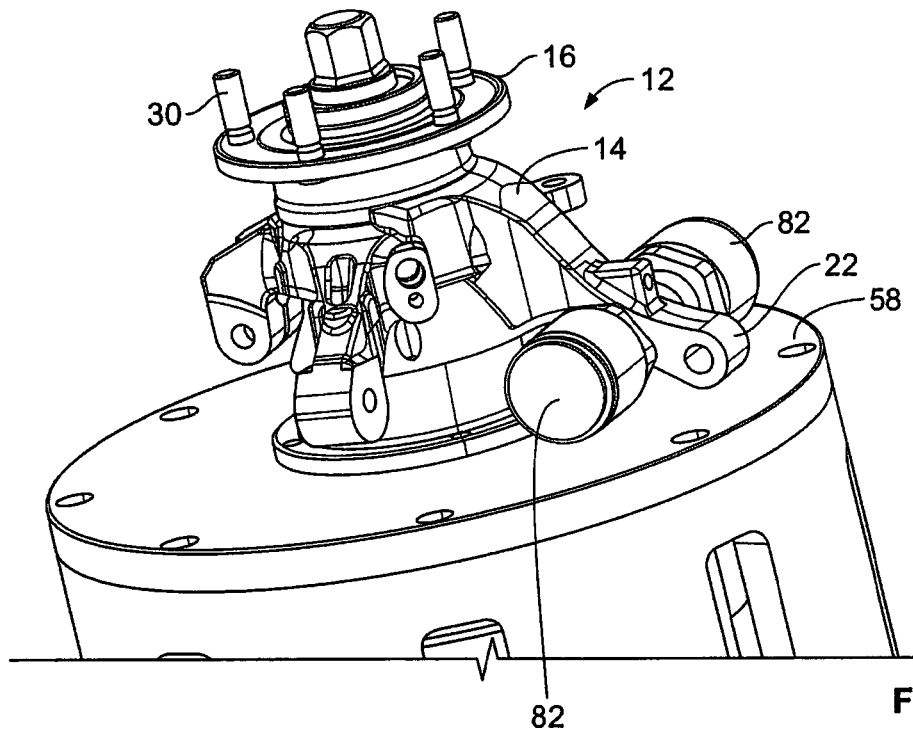
FIG. 1 is a perspective view of a fixture for final finishing a wheel hub of a knuckle assembly in accordance with the present teachings.
Figure 2:
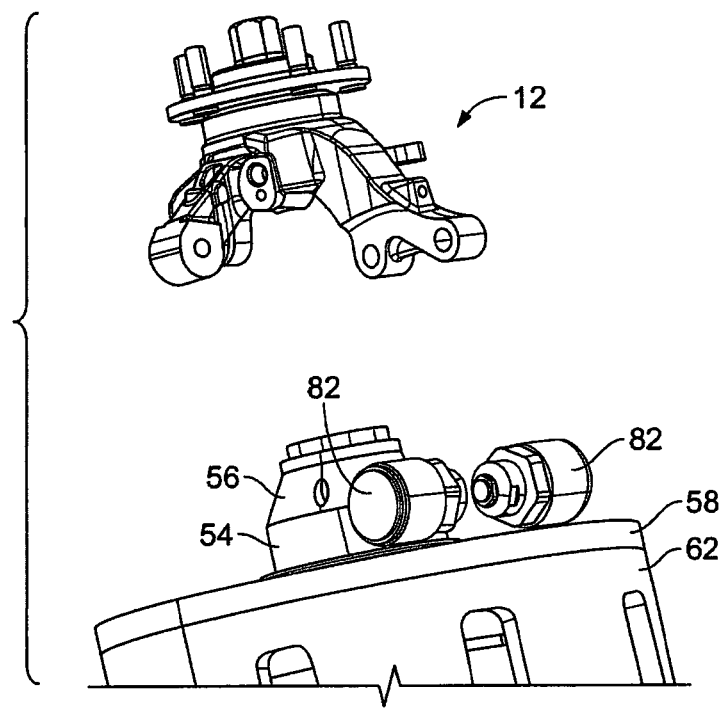
FIG. 2 is a perspective view of a portion of the fixture of FIG. 1, the fixture shown exploded relative to the knuckle assembly.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure.

Referring generally to the drawings, an apparatus or fixture for final finishing a wheel hub of a knuckle assembly in accordance with the present teachings is illustrated and generally identified at reference character 10. The fixture 10 is operatively illustrated with the knuckle assembly 12. As will become apparent below, the fixture 10 may be used for final finishing of a wheel hub of the knuckle assembly.

Prior to addressing the construction and operation of the fixture of the present teachings, a brief understanding of the knuckle assembly 12 is warranted. It will be understood that the knuckle assembly 12 illustrated throughout the drawings is exemplary. In this regard, the present teachings may be adapted to other knuckle assemblies within the scope of the present invention.

The knuckle assembly 12 generally includes a knuckle 14 and a hub 16. The knuckle 14 may be cast of iron or otherwise suitably formed and includes a main body 18 defining a cylindrical bore 20. A plurality of attachment arms 22 extend from the main body 18 and are attached to the vehicle suspension in a manner well known in the art.

The hub 16 may be formed of steel or other suitable material and generally includes a flange 24 and a neck 26. The flange 24 defines a generally circular disc and includes a plurality of apertures 28 through which mounting bolts 30 extend. The mounting bolts 30 include threaded ends. The threaded ends are oriented with threaded ends extending outwardly. The threaded ends connect a rotor (not shown) and an associated wheel (not shown) onto the hub 16 in a conventional manner. The hub 16 includes a face directed toward the rotor which may be finished with a lathe (not shown). As will become more apparent below, the fixture 10 of the present teachings may be used to reduce lateral runout of this face of the hub 16 upon final finishing.

The knuckle 14 and the hub 16 are rotatably coupled with a wheel bearing 32. The wheel bearing 32 radially surrounds the neck 26 of the hub 16. In the embodiment illustrated, the wheel bearing 32 includes a pair of inner races 34 and an outer race 36. The inner races 34 may be press-fit to the neck 26 of the hub 16 for rotation therewith. Similarly, the outer race 36 may be press-fit into the cylindrical bore 20 of the knuckle 14 for rotation therewith.

With continued reference to the drawings, the fixture 10 of the present teachings will be further described. As illustrated, the fixture 10 may generally include a holder or drive shaft 40, a spindle driver 42, a main clamping shaft 44, a centering collet 46 and a nut 48. The drive shaft 40 and the main clamping shaft 44 may collectively define a drive member for rotating the hub 16 in a manner discussed below. The fixture 10 is further illustrated to generally include a clamping collet 50, a clamping piston 52, a clamping cylinder housing 54, a clamping sleeve 55 and a knuckle interface housing 56. The clamping collet 50 and the clamping piston 52 may be coupled for relative movement and thereby cooperate to define a piston. The clamping cylinder housing 54 and the knuckle interface housing 56 may cooperatively define a clamp housing or housing for a clamping arrangement. The fixture 10 may further include a mounting plate 58 to which the remainder of the fixture 10 may be secured.

Figure 3:
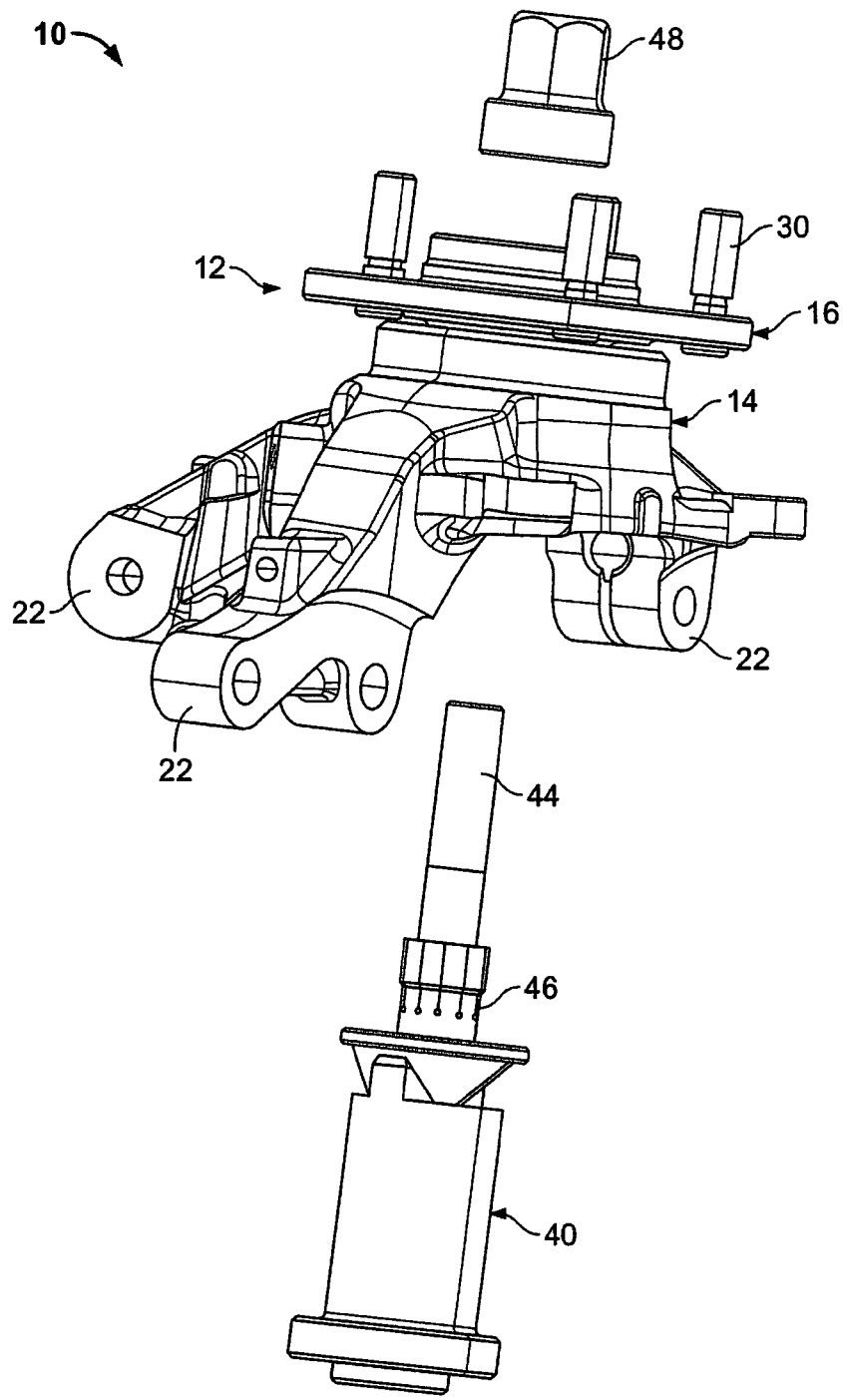
FIG. 3 is an exploded side view of a portion of the fixture of FIG. 1 and the knuckle assembly.
Figure 4:
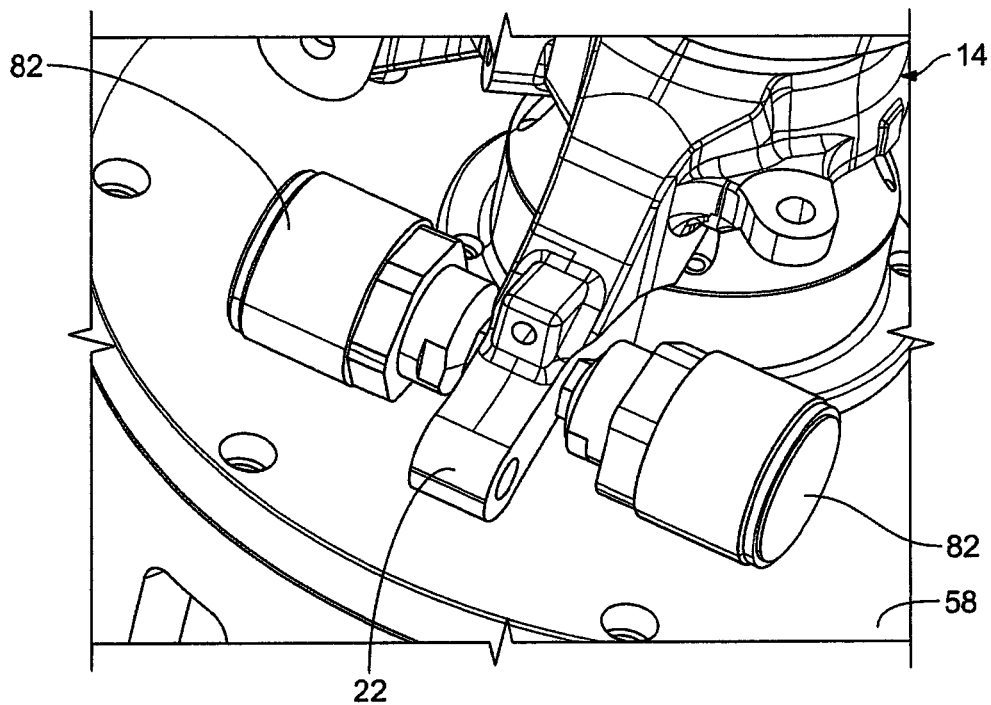
FIG. 4 is an enlarged perspective view of a portion of the fixture and knuckle assembly of FIG. 1.
Figure 5:
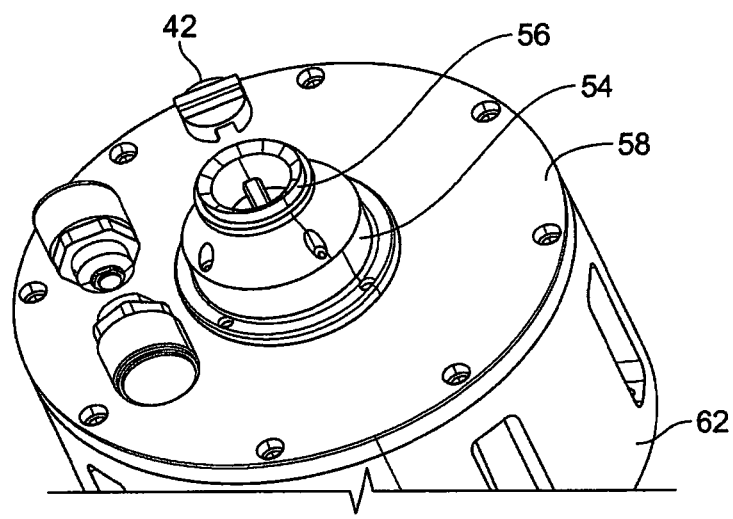
FIG. 5 is an exploded perspective view of a portion of the fixture of FIG. 1.
Figure 6:
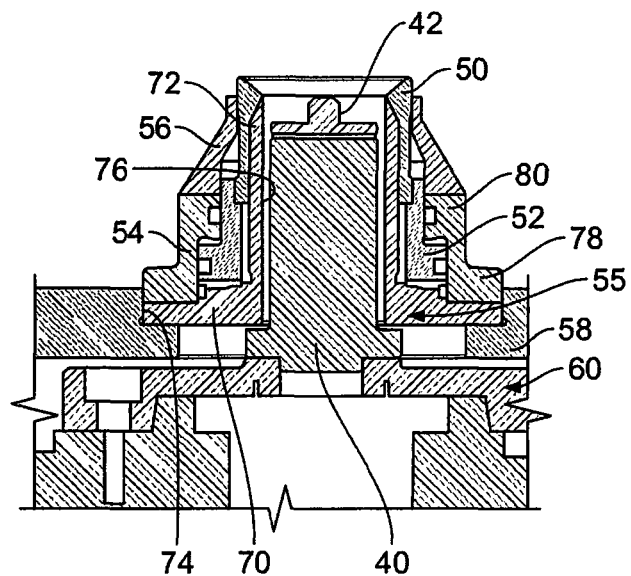
FIG. 6 is a cross-sectional view taken through the fixture of FIG. 1, the fixture illustrated to include a drive arrangement for rotating a main drive shaft.
Figure 7:
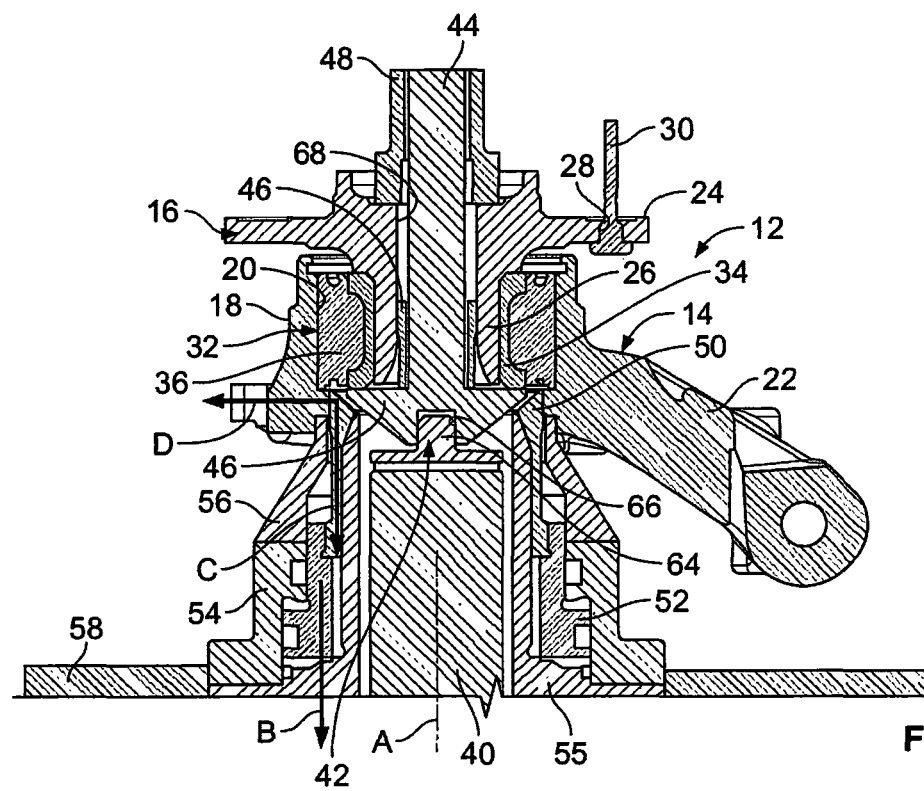
FIG. 7 is a cross-sectional view taken through the fixture and knuckle assembly of FIG. 1.

The drive shaft 40 may be generally cylindrical and elongated along an Axis A (see FIG. 7, for example). A lower end of the drive shaft 40 may extend through a bore in the plate 58 and may be configured to cooperate with a drive arrangement 60 disposed below the plate 58 and within a housing 62. The drive arrangement 60 may rotate the drive shaft 40 about the Axis A under a source of power. An upper end of the drive shaft 40 may carry the spindle driver 42. The spindle driver 42 may be integrally formed with the drive shaft 40 (as shown in FIG. 3, for example) or formed as a separate element (as shown in FIGS. 6 and 7, for example) and secured to the drive shaft 40 in any manner well known in the art.

The spindle driver 42 may be configured to engage and drive the main clamping shaft 44 in response to rotation of the drive shaft 40. One of the spindle driver 42 and a lower end of the clamping shaft 44 may include a male element and the other of the spindle driver 42 and the lower end of the clamping shaft 44 may include a cooperate female element for transferring torque therebetween. As illustrated, the spindle driver 42 may include a keel 64 or similar structure that may be received within a cooperating slot 66 defined in a lower end of the clamping shaft 44. Alternatively, the spindle driver 42 may include the slot 66 and the lower end of the clamping shaft 44 may include the slot.

The clamping shaft 44 may be disposed on the Axis A and thus be co-linear with the drive shaft 40. As illustrated, the lower end of the drive shaft 40 may be enlarged relative to an elongated shaft of the main clamping shaft 44 and may be generally frustoconical in shape. The frustoconical shape may taper in a downward direction.

As will be appreciated, allowing the drive shaft 40 and the main clamping shaft 44 to be non-collinear allows a rotational axis of the wheel hub 16 to be non-collinear to an axis of a lathe spindle rotating the wheel hub 16. Aligning the rotational axes of the main clamping shaft 44 and the bearing 32 ensures that the wheel hub 16 is rotated about its own axis. Rotating the wheel hub 16 about its own axis rather than rotating the wheel hub 16 about the lathe spindle axis during finishing may thereby improves perpendicularity of the finished wheel hub flange faces and the bearing axis.

The centering collet 46 may radially surround the elongated shaft of the clamping shaft 44. As illustrated, the centering collet 46 may be disposed proximate the enlarged lower end of the clamping shaft 44. The centering collet 46 may define a plurality of splines for engaging cooperating splines conventionally defined within a bore 68 of the hub 16. The centering collet 46 is operative to center the clamping shaft 44 relative to the hub 16.

An upper end of the clamping shaft 44 may be threaded. The threads may engage the nut 48. The nut 48 may be tightened to clamp the knuckle assembly 12 and pre-load the bearing 32. In this regard, the two inner races 34 are displaced axially toward one another prior to finish turning.

The clamping sleeve 55 includes a lower flange 70 and an upwardly extending cylinder 72. The lower flange 70 may be disposed in a counterbore 74 defined by the plate 58 such that the lower flange 70 is vertically supported within the opening 74 and laterally constrained therein. The clamping sleeve 55 defines a bore 76 that receives the drive shaft 40.

The clamping cylinder housing 54 and the knuckle interface housing 56 cooperate to define a clamping housing that radially surrounds the clamping sleeve 55. As illustrated, the housings 54 and 56 may be two separate components that are welded, bolted or otherwise suitably secured to one another in a conventional manner. Where the clamping cylinder housing 54 and the knuckle interface housing 56 are distinct components, they may be manufactured of distinct materials. Alternatively, the clamping cylinder housing 54 and the knuckle interface housing 56 may be formed as a single component.

The clamping cylinder housing 54 includes a lower flange 78 and an upper cylindrical portion 80. The lower flange 78 may be vertically supported on the flange 70 of the clamping sleeve 55. The knuckle interface housing 56 may upwardly extend from the clamping cylinder housing 54 and may be generally frustoconical in shape. In this regard, the knuckle interface housing 56 may taper upwardly. As shown in FIG. 7, the upper end of the knuckle interface housing 56 may be received within a counterbore of the knuckle 14.

The clamping piston 52 may be radially positioned between the clamping cylinder housing 54 and the clamping sleeve 55. The clamping piston 52 is vertically displaceable in a downward direction as indicated by Arrow B in FIG. 7. This clamping movement will be described further below.

The clamping collet 50 may be radially disposed between the knuckle interface housing 56 and the clamping sleeve 55. As perhaps best shown in the cross-sectional view of FIG. 7, a lower end of the clamping collet 50 is captured by the clamping piston 52 and thereby coupled together for relative movement in a vertical direction. As such, when the clamping piston 52 moves in the direction of Arrow B, the clamping collet 50 correspondingly moves downward, as indicated by Arrow C.

An upper end of the clamping sleeve 55 is formed to include a taper. The upper end of the clamping collet 50 is formed to include a cooperating taper. When the clamping collet 50 is vertically displaced downward (as indicated by Arrow C), the clamping sleeve 55 forces the upper end of the clamping collet radially outward (as indicated by Arrow D).

In the manner discussed above, the clamping piston 52 may cooperate with the clamping collet 50 to clamp the main clamping shaft 44 within a back bore of the knuckle 14 of the knuckle assembly 12. Centering the main clamping shaft 20 within the wheel hub 14 and clamping the main clamping shaft 20 within the knuckle back bore aligns the rotational axes of the main clamping shaft 20 and the wheel hub 14 so that the wheel hub 14 may be rotated about the preloaded bearing axis.

Prior to clamping the knuckle assembly 12, the wheel hub 16 may be placed over the main clamping shaft 44 and the nut 48 may be tightened. Tightening of the nut 48 onto the main clamping shaft 44 preloads the wheel bearing 32 of the knuckle assembly 14 by displacing the two inner bearing races axially in relation to each other. The nut 48 may be tightened using a service torque (e.g., 160 ft/lb) and the drive shaft 40 can be fixed to prevent the main clamping shaft 44 from rotating while the nut 48 is tightened. The knuckle back bore may be positioned on the knuckle interface housing 56 and the arm 22 can be positioned between the hydraulic clamps 82.

Clamping the knuckle assembly 12 relative to the fixture 10 will now be further described. The process may be generally characterized as a two-step process. In a first step, the clamping piston 52 may be hydraulically actuated in the direction of the Arrow A (e.g., generally downward as shown in FIG. 7). In turn, the clamping piston 52 may act on the clamping collet 50 generally in the same direction (e.g., as indicated by Arrow C) to downwardly displace the clamping collet 50. As a result, a wedged end of the clamping sleeve 55 biases the clamping collet 50 radially outward against the knuckle back bore, as indicated by the Arrow D of FIG. 7.

In a second step, the knuckle assembly 12 is rotationally captured. The fixture 10 is further illustrated to include a pair of hydraulic clamps 82. Upon actuation, the hydraulic clamps 82 bias capture one of the arms 22 of the knuckle 14 to prevent the knuckle 14 from rotating during the finishing process. Alternately, this could be accomplished with one hydraulic clamp and a fixed stop.

The knuckle 14 is now fixed relative to the fixture 10. The hub 16 may be rotated relative to the lathe for final finishing of flange faces of the hub 16. One of the flange faces for finishing is located radially inward from the plurality of wheel bolts 30 carried by the hub 16. Another of the flange faces for finishing is located radially outward from the plurality of wheel bolts 30. Both flange faces may be finished perpendicular to the preloaded bearing axis which ensures proper rotor positioning and thereby minimizes uneven rotor wear in service, which may result in rotor thickness variation and subsequent customer dissatisfaction.

While specific examples have been described in the specification and illustrated in the drawings, it will be understood by those skilled in the art that various changes may be made and equivalence may be substituted for elements thereof without departing from the scope of the present teachings as defined in the claims. Furthermore, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings.

The invention claimed is:

1. A fixture for final finishing flange faces of a hub of a knuckle assembly, the fixture comprising:
    a mounting surface;
    a drive arrangement for engaging and rotating the hub of the knuckle assembly relative to the remainder of the knuckle assembly, the drive arrangement including a drive member extending along a drive axis, the drive member rotatable about the drive axis; and
    a clamping arrangement carried by the mounting surface, the clamping arrangement radially surrounding the drive arrangement and operative for clamping the fixture relative to the mounting surface, the clamping arrangement including a housing, a piston assembly radially positioned between the housing and the drive member, and a clamping sleeve radially disposed between the piston assembly and the drive member, the piston movable in a first direction generally parallel to the drive axis, the clamping sleeve and the piston cooperatively configured to radially force an upper end of the piston assembly radially outward in a second direction in response to movement of the piston in the first direction for engaging a back bore of the knuckle assembly.

2. The fixture for final finishing flange faces of a hub of a knuckle assembly of claim 1, wherein the piston assembly includes a first member and a second member coupled for movement in the first direction.

3. The fixture for final finishing flange faces of a hub of a knuckle assembly of claim 1, wherein the drive member includes an upper shaft portion rotatably coupled with a lower shaft portion.

4. The fixture for final finishing flange faces of a hub of a knuckle assembly of claim 1, wherein the piston assembly includes a clamp piston and a clamping collet coupled to one another for translation.

5. The fixture for final finishing flange faces of a hub of a knuckle assembly of claim 4, wherein an upper end of the clamping sleeve is formed to include a taper and an upper end of the clamping collet is formed to include a cooperating taper such that linear motion of the clamping sleeve relative to the clamping collet radially displaces the upper end of the clamping collet.

6. The fixture for final finishing flange faces of a hub of a knuckle assembly of claim 1, wherein the housing of the clamping arrangement includes an upper portion coupled to a lower portion.

7. The fixture for final finishing flange faces of a hub of a knuckle assembly of claim 1, wherein the piston assembly is hydraulically controlled.

8. A fixture for final finishing flange faces of a hub of a knuckle assembly, the fixture comprising:
   a mounting surface;
   a drive arrangement for engaging and rotating the hub of the knuckle assembly relative to the remainder of the knuckle assembly, the drive arrangement including an upper shaft portion and a lower shaft portion, the upper shaft portion and the lower shaft portion coupled for rotation and commonly aligned on a drive axis; and
   a clamping arrangement carried by the mounting surface, the clamping arrangement radially surrounding the drive arrangement and operative for clamping the fixture relative to the mounting surface;
   wherein the upper shaft portion is a clamping drive shaft and the lower shaft portion is a main drive shaft; and
   wherein the clamping drive shaft includes a first enlarged end and a second threaded end, the second threaded end engaging a nut such that tightening of the nut clamps the knuckle assembly between the nut and the first enlarged end and provides a pre-load to a bear of the knuckle assembly.

9. The fixture for final finishing flange faces of a hub of a knuckle assembly of claim 8, wherein one of the lower end of the clamping shaft and the upper end of the main drive shaft includes a male element and the other of the clamping shaft and the main drive shaft includes a cooperate female element for transferring torque therebetween.

10. The fixture for final finishing flange faces of a hub of a knuckle assembly of claim 9, wherein the upper end of the main drive shaft includes a keel and the lower end of the clamping shaft includes a cooperating slot receiving the keel.

11. The fixture for final finishing flange faces of a hub of a knuckle assembly of claim 10, wherein the keel is defined by a spindle driver carried at an upper end of the main drive shaft.

12. The fixture for final finishing flange faces of a hub of a knuckle assembly of claim 8, wherein the first enlarged end of the clamping drive shaft is frustoconical in shape.

13. A method of securing a knuckle assembly in a fixture for final finishing flange faces of a hub of the knuckle assembly, the method comprising:
   providing a fixture comprising:
      a mounting surface;
      a drive arrangement for engaging and rotating the hub of the knuckle assembly relative to the remainder of the knuckle assembly, the drive arrangement including a drive member extending along a drive axis, the drive member rotatable about the drive axis; and
      a clamping arrangement carried by the mounting surface, the clamping arrangement radally surroundng the drive arrangement and operative for clamping the fixture relative to the mounting surface, the clamping arrangement including a housing, a piston assembly radially positioned between the housing and the drive member, and a clamping sleeve radially disposed between the piston member and the drive member, the piston movable in a first direction generally parallel to the drive axis, the clamping sleeve and the piston cooperatively configured to radially force an upper end of the piston assembly radially outward in a second direction in response to movement of the piston in the first direction for engaging a back bore of the knuckle assembly;
   translating the piston in the first direction;
   radially forcing the upper end of the piston assembly outward in the second direction in response to movement of the piston in the first direction; and
   engaging a back bore of the knuckle assembly with the upper end of the piston assembly.

* * * * *